United States Patent
Chan

(10) Patent No.: US 8,254,506 B2
(45) Date of Patent: *Aug. 28, 2012

(54) ADAPTIVE ELECTRONIC TRANSMISSION SIGNAL CANCELLATION APPARATUS FOR FULL DUPLEX COMMUNICATION

(75) Inventor: Kevin T. Chan, Pasadena, CA (US)

(73) Assignee: Broadcom Corporation, Irvine, CA (US)

(*) Notice: Subject to any disclaimer, the term of this patent is extended or adjusted under 35 U.S.C. 154(b) by 52 days.

This patent is subject to a terminal disclaimer.

(21) Appl. No.: 12/796,329

(22) Filed: Jun. 8, 2010

(65) Prior Publication Data

US 2010/0322120 A1    Dec. 23, 2010

Related U.S. Application Data

(63) Continuation of application No. 11/383,679, filed on May 16, 2006, now Pat. No. 7,733,994, which is a continuation of application No. 11/064,204, filed on Feb. 23, 2005, now Pat. No. 7,046,752, which is a continuation of application No. 10/848,350, filed on May 18, 2004, now Pat. No. 7,492,840, which is a continuation of application No. 10/087,239, filed on Mar. 1, 2002, now Pat. No. 6,744,831, which is a continuation of application No. 09/375,834, filed on Aug. 16, 1999, now Pat. No. 6,373,908.

(60) Provisional application No. 60/108,001, filed on Nov. 11, 1998.

(51) Int. Cl.
*H03D 1/04* (2006.01)

(52) U.S. Cl. ......... 375/346
(58) Field of Classification Search ......... 370/282, 370/284; 375/219, 285, 295, 346; 455/296
See application file for complete search history.

(56) References Cited

U.S. PATENT DOCUMENTS

| | | | | |
|---|---|---|---|---|
| 6,744,831 B2* | 6/2004 | Chan | ......... | 375/346 |
| 7,046,752 B2* | 5/2006 | Chan | ......... | 375/346 |

* cited by examiner

*Primary Examiner* — Leon-Viet Nguyen
(74) *Attorney, Agent, or Firm* — Thomas, Kayden, Horstemeyer & Risley LLP.

(57) ABSTRACT

An adaptive electronic transmission signal cancellation circuit for separating transmit data from receive data in a bidirectional communication system operating in full duplex mode is disclosed. The output of a main transmitter responsive to a first bias current is connected to the output of a receiver through an internal resistor. A first replica transmitter responsive to a second bias current and matched to the main transmitter current gain and rise/fall time characteristics is connected to the input terminal of the receiver, and produces a cancellation voltage between the output terminal of the main transmitter and the input terminal of the receiver as a function of the second bias current and the internal resistor. A second replica transmitter matched to the current gain and rise/fall time characteristics of the main transmitter and the first replica transmitter and responsive to the second bias current is connected to the output terminal of the main transmitter for canceling excess current, developed by the first replica transmitter, at the output terminal of the main transmitter.

25 Claims, 5 Drawing Sheets

ADAPTIVE ELECTRONIC TRANSMISSION SIGNAL CANCELLATION APPARATUS FOR FULL DUPLEX COMMUNICATION

CROSS-REFERENCE TO RELATED APPLICATIONS

This patent application is a continuation of U.S. patent application Ser. No. 11/383,679, filed on May 16, 2006, now U.S. Pat. No. 7,733,994, which is a continuation of U.S. patent application Ser. No. 11/064,204, filed on Feb. 23, 2005, now U.S. Pat. No. 7,046,752, which is a continuation of U.S. patent application Ser. No. 10/848,350, filed on May 18, 2004, now U.S. Pat. No. 7,492,840, which is a continuation of U.S. patent application Ser. No. 10/087,239, filed on Mar. 1, 2002, now U.S. Pat. No. 6,744,831, which is a continuation of U.S. patent application Ser. No. 09/375,834, filed Aug. 16, 1999, now U.S. Pat. No. 6,373,908, which claims the benefit of the filing date of U.S. Provisional Patent Application Ser. No. 60/108,001, filed Nov. 11, 1998 and entitled ADAPTIVE ELECTRONIC HYBRID LINE DRIVER FOR GIGABIT ETHERNET, all contents of which are hereby expressly incorporated herein by reference.

FIELD OF THE INVENTION

The present invention is directed to full duplex bidirectional communication systems and, more particularly, to an integrated electronic circuit for separating transmit data from receive data in a high-speed bidirectional data transmission line such as gigabit Ethernet.

BACKGROUND OF THE INVENTION

The past few years has witnessed an almost exponential growth in the extent of high speed data networks, and the data transmission speeds contemplated over such networks. In particular, bidirectional data transmission in accordance with the various Ethernet network protocols, over unshielded twisted pair (UTP) wiring, has emerged as the network implementation of choice for general commercial LAN installations as well as for some of the more prosaic residential and academic applications.

Local Area Networks (LAN) provide network connectivity for personal computers, workstations and servers. Ethernet, in its original 10BASE-T form, remains the dominant network technology for LANs. However, among the high speed LAN technologies available today, Fast Ethernet, or 100BASE-T, has become the leading choice. Fast Ethernet technology provides a smooth, non-disruptive evolution from the 10 megabits per second (Mbps) performance of the 10BASE-T to the 100 Mbps performance of the 100BASE-T. The growing use of 100BASE-T connections to servers and desktops is creating a definite need for an even higher speed network technology at the backbone and server level.

The most appropriate solution to this need, now in development, is Gigabit Ethernet. Gigabit Ethernet will provide 1 gigabit per second (Gbps) bandwidth with the simplicity of Ethernet at lower cost than other technologies of comparable speed, and will offer a smooth upgrade path for current Ethernet installations. However implemented, the latest high-speed Ethernet protocols contemplate simultaneous, full bandwidth transmission, in both directions (termed full duplex), within a particular frequency band, when it is desirable to maximize transmission speed. However, when configured to transmit in full duplex mode, it is evident that the transmitter and receiver sections of a transceiver circuit must be coupled together, in parallel fashion, at some transmission nexus short of twisted pair transmission channel.

Because of the nexus coupling together of the transmitter and receiver, it is further evident that the simultaneous assertion of a receive signal and a transmit signal, on the transmission nexus, will cause the receive signal to become substantially impaired or modified in the absence of some methodology to separate them.

Standard arrangements for achieving this isolation or transmit/receive signal separation in the prior art include complex hybrid circuitry provided as a separate element external to an integrated circuit transceiver chip. Hybrids are generally coupled between the transmit/receive signal nexus (the channel) and the transmit and receive signal I/Os, as depicted in the generalized system diagram of FIG. 1.

FIG. 1 illustrates a simplified block diagram of a multi-pair communication system operating in conformance with the IEEE 802.3 standard (also termed 1000BASE-T) for 1 gigabit (Gb/s) Ethernet full-duplex communication over four twisted pairs of Category-5 copper wires. The communication system illustrated in FIG. 1 is represented as a point-to-point system, in order to simplify the explanation, and includes two main transceiver blocks 2 and 3, coupled together with four twisted-pair cables 4a, b, c and d. Each of the wire pairs is coupled between transceiver blocks through a respective one of four hybrid circuits 5 and communicate information developed by respective ones of four transmitter/receiver circuits (constituent transceivers) 6 coupled between respective hybrid circuits and a Physical Coding Sublayer (PCS) block 8 Each of the four constituent transceivers 6 are capable of operating simultaneously at 250 megabits per second (Mb/s), and are coupled through a respective hybrid circuit to facilitate full-duplex bidirectional operation. Thus, 1 Gb/s communication throughput of each of the transceiver blocks 2 and 3 is achieved by using four 250 Mb/s (125 Mbaud at 2 bits per symbol) constituent transceivers for each of the transceiver blocks and four pairs of twisted copper cables to connect the two transceivers together.

A hybrid circuit is basically an externally coupled electrical bridge circuit including costly magnetic elements which isolates the transmit signal path from the receive signal path when the circuit is in a balanced condition. In such hybrid circuits, the balance condition requires that the terminating impedance equal the impedance of the channel (a twisted pair cable) for any significant degree of isolation or signal separation. Since this impedance is dynamic, and since the frequency dependent nature of this dynamic impedance is complex and not readily reproducible, only an approximate cancellation is achieved in practice. Direct leakage across the hybrid circuit and delayed echoes caused by impedance and timing mismatches will thus cause transmitter signal components to interfere with a received distant signal. The effect of this echo is particularly apparent, and particularly problematic, as transmission speeds increase.

Although small amounts of impedance mismatching is tolerable for analog voice applications, real-time, full duplex data transmission requires that the amount of hybrid echo be minimized. One method of dealing with the more stringent requirements of real-time, full duplex data transmission, is to substantially increase the complexity of any hybrid circuit coupled between the transmission channel, the transmit DAC and the receive ADC of a transceiver system; some transceiver circuits going so far as to implement both single-ended and differential hybrid circuits.

Notwithstanding the foregoing, local hybrid echo represents a serious impairment to receive signals in high speed, full duplex data communication devices. Indeed, the local hybrid echo path model is commonly used to assess a particular echo level in a transceiver/channel system and as a reference for design of down-stream echo cancellation circuitry. In addition to excess complexity and non-linear response, hybrid circuits represent costly, marginally acceptable solutions to the transmit/receive signal separation issue.

It would be beneficial, both to circuit performance and to manufacturing economies, if a local transmit signal were to be separated from a receive signal, in full duplex operation, without the need for complex and costly hybrid circuitry. Such separation should be accommodated by circuitry resident on an integrated circuit transceiver chip and in relative proximity/to the signals being processed. Such separation should further be performed in a substantially linear fashion, i.e., frequency independent, and be substantially immune to semiconductor process tolerance, power supply and thermal parameter variations.

SUMMARY OF THE INVENTION

A bidirectional communication system is configured for full duplex communication over a communication channel. The system is constructed to incorporate a main transmitter having an output for serving a transmit signal on a transmit signal path electrically coupled between the communication channel and the output of the transmitter. The system also incorporates a receiver having an input connected to a receive signal path electrically coupled to the communication channel for receiving a receive signal. A transmit signal cancellation circuit is electrically coupled to the receive signal path, and develops a cancellation signal, which is an analogue of the transmit signal, which is asserted to the receive signal path so as to prevent the transmit signal from being superposed on a receive signal at the input of the receiver.

The transmit signal cancellation circuit incorporates first and second replica transmitters, each of which are connected to and operatively responsive to a digital word representing an analog signal to be transmitted. The first replica transmitter is coupled to the receive signal path and develops a voltage mode signal which is equal to but opposite in phase of a voltage mode portion of the transmit signal. The second replica transmitter is also coupled to the receive signal path and develops a current mode signal having a direct phase relationship with the transmit signal. The voltage mode and current mode signals are combined with the transmit signal on the receive signal path and, in combination, cancel voltage and current mode components of the transmit signal that might appear at the inputs of the receiver during simultaneous transmission and reception.

In one particular aspect of the invention, the main transmitter and the first and second replica transmitters are constructed as current mode digital-to-analog converters. The main transmit DAC outputs a differential analog current mode signal which is converted to a differential voltage mode signal by a load impedance incorporated in a line interface circuit. The first replica DAC outputs a first analog differential current mode signal which is converted to a voltage mode signal by a cancellation impedance circuit coupled into the receive signal path between the first replica DAC and the output of the main transmit DAC.

The second replica DAC also outputs a differential analog current mode signal to the receive signal path. The current mode signal provided by the second replica DAC is provided in order to compensate for excess current sourced/sunk to the signal path by operation of the first replica DAC.

In a further aspect of the invention, an integrated circuit transceiver separates transmit data from receive data in a bidirectional communication system by use of two replica DACs, a positive replica DAC and a negative DAC, each constructed to perform identically to a main transmit DAC except for a gain function. The negative replica DAC in combination with a cancellation impedance, generates a cancellation voltage which is subtracted from a transmit signal. The positive replica DAC generates a cancellation current which is subtracted from the sum of the cancellation voltage and the transmitted signal so as to compensate for excess current developed by the negative replica DAC. Thus, two matched replica DAC transmitters isolate a transmission signal from the receiver while maintaining a balanced transmission voltage and current at a transmission channel load. A cancellation voltage, equal to the output voltage of a main transmit DAC is generated by one of the replica transmitters across a cancellation impedance circuit. The cancellation voltage is subtracted from the output voltage of the main transmit DAC. The second replica DAC transmitter generates a cancellation current equal to the current generated by the first replica DAC transmitter so as to maintain said balanced transmission voltage and current at the load.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

Figure 1:
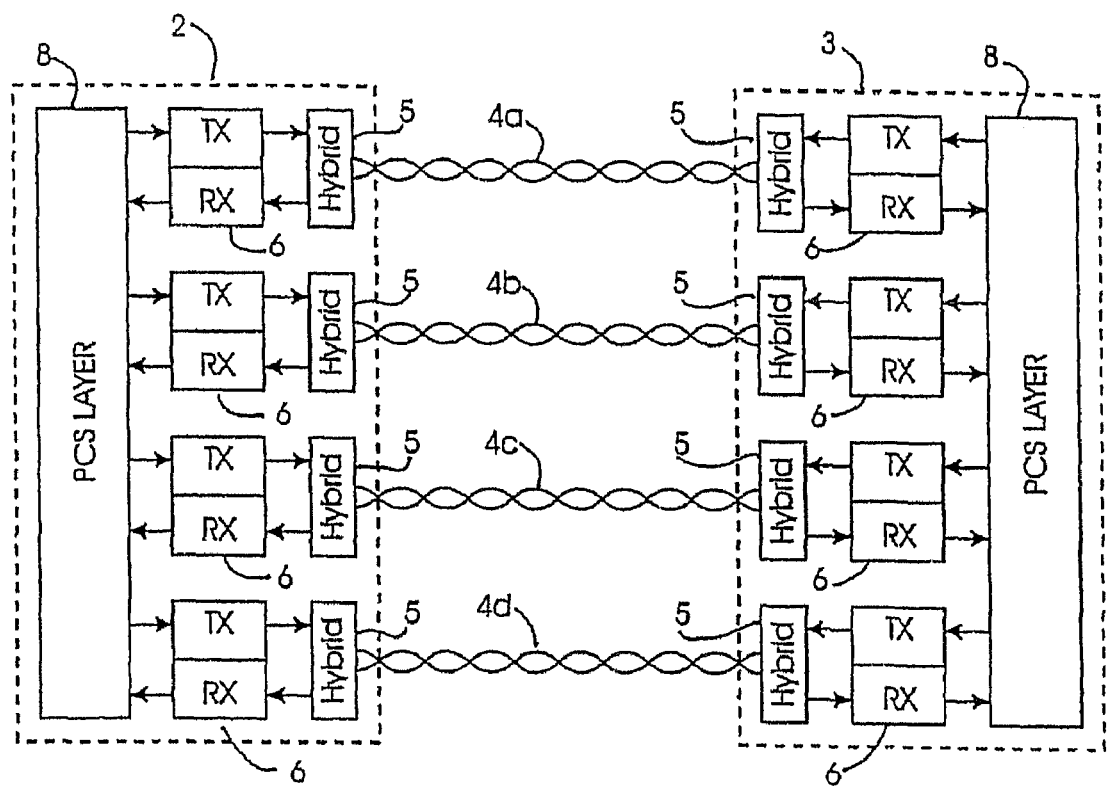
FIG. 1 is a semi-schematic, simplified block diagram representation of a local and remote transceiver pair communicating over a bidirectional transmission channel, in accordance with the prior art.
Figure 2:
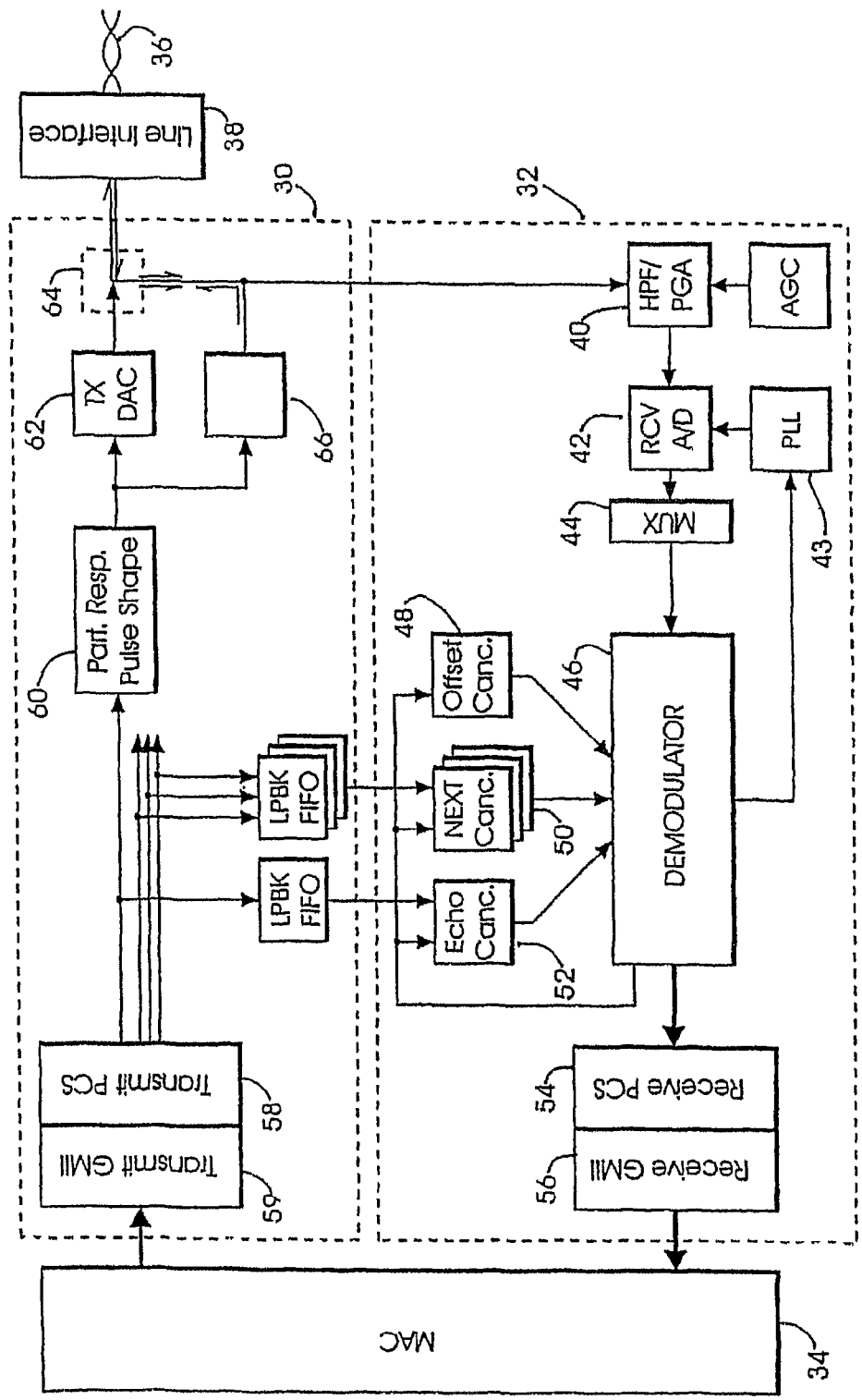
FIG. 2 is a semi-schematic, simplified block diagram of a transceiver, adapted for full duplex communication, including a fully digital transmission signal cancellation circuit, in accordance with the present invention.

FIG. 2 is a simplified block diagram of one implementation of a transceiver system, adapted for full duplex communication, the arrangement of which is pertinent to an understanding of the principles of operation of the present invention. The exemplary transceiver of FIG. 2 encompasses the physical layer (PHY) portion of a transceiver and is illustrated as including a transmitter section 30 and a receiver section 32, coupled between a media access layer (MAC) 34 and a communication channel; in this case, represented by twisted pair wiring, also termed unshielded twisted pair (or UTP) wiring.

The transceiver of the illustrated embodiment operates in accordance with a transmission scheme which conforms to the 1000BASE-T standard for 1 gigabit per second (Gd/s) Ethernet full-duplex communication over four twisted pairs of Category-5 copper cables. For ease of illustration and description, the embodiment of FIG. 2 depicts only one of four 250 Mb/s constituent transceivers which are configured in parallel fashion and which operate simultaneously in order to effect 1 Gb/s communication. Where signal lines are common to all four of the constituent transceivers, they are rendered in a bold line style. Where signal lines are relate to a single transceiver, they are rendered in a thinner line style.

In operation, the receive path of the exemplary transceiver circuit of FIG. 2 receives an analog signal from the twisted pair cable 36 through a simplified line interface circuit 38. The line interface circuit is termed simplified because it is constructed with a significantly lower complexity than conventional hybrid circuits, as will be developed in greater detail below. The received analog signal is provided to the receiver section 32 where it may be preconditioned by filter/amplification circuitry 40, such as a high-pass filter (HPF) and programmable gain amplifier (PGA), before being converted to a digital signal by a receive analog-to-digital converter (ADC) 42 operating at a sampling rate of about 125 MHz. ADC timing is controlled by the output of a timing recovery circuit 43 which might be configured as a phase-lock-loop (PLL) or some other feed-back configured circuitry.

The digital signal output by the receive ADC 42, along with the outputs from the receive ADCs (not shown) of the other three constituent transceivers, is input to a pair-swap multiplexer circuit (MUX) 44 which functions to sort out the four input signals from the four ADCs and direct each signal to its respective appropriate demodulator circuit for demodulation and equalization. Since the coding scheme for gigabit communication is based on the fact that the signals carried by each twisted pair of wire correspond to a one-dimensional (1D) constellation and that the four twisted wire pairs collectively form a four-dimensional (4D) constellation, each of the four twisted wire pairs must be uniquely identified to a particular one of the four dimensions for decoding to function correctly. Any undetected and uncompensated swapping of wire pairs would result in erroneous decoding. The pair swap MUX 44 maps the correct input signal to the demodulation circuit 46.

Demodulator 46 functions to demodulate the received digital signal and might also provide for channel equalization. Channel equalization might suitably include circuitry for compensating the inter-symbol-interference (ISI) introduced by partial response pulse shaping circuitry in the transmitter section of the remote transceiver which transmitted the analog equivalent of the digital receive signal. In addition to ISI compensation, the demodulator also compensates for other interference components by subtracting echo, offset and near end cross-talk (NEXT) cancellation vectors from the digital receive signal. In particular, an offset cancellation circuit 48 generates an estimate of the offset introduced at the transceiver's analog front end (including the PGA and ADC). Three NEXT cancellation circuits, collectively identified as 50, model the near end cross-talk impairments in the receive signal caused by interference between the receive signal and the symbols (signals) sent by the transmitter sections of the other three local constituent transceivers. Since the NEXT cancellation circuits so are coupled to the transmit signal path, each receiver has access to the data transmitted by the other three local transmitters. Thus, NEXT impairments may be replicated by suitable filtering. By subtracting the output of the NEXT cancellation circuits 50 from the receive signal, NEXT impairments may be approximately canceled.

Classical echo cancellation is accomplished in a similar manner, in the illustrated embodiment, by an echo cancellation circuit 52 coupled between the transmitter section 30 and the demodulation circuit 46. Due to the bidirectional nature of the channel, each local transmitter causes an echo impairment on the receive signal or the local receiver section with which it is paired to form a constituent transceiver. Echo cancellation circuit 52 may be suitably implemented as an adaptive filter which functions to model the echo impairment by filtering the local transmit signal to produce an echo replica signal. This replica signal is subtracted from the receive signal in the demodulator circuit 46 in order to approximately cancel the echo impairment.

Following echo, NEXT and offset cancellation, the receive signal is decoded (by a trellis decoder, for example) and provided to a receive physical coding sublayer (PCS) block 54 and thence to the media access layer (MAC) 34 through a gigabit media independent interface circuit (GMII) 56.

In transmit operations, transmit signals are provided by the MAC 34 to a transmit PCS block 58 through a transmit GMII circuit 59. Coded signals might be processed by a partial response pulse shaping circuit 60 and directed to a transmit digital-to-analog converter (TX DAC) 62 for conversion into analog signals suitable for transmission over twisted pair wiring 36 to a remote receiving device. Line interface circuitry 38 is coupled between the TX DAC 62 and the wire pair 36 in a manner to be described further below.

Bidirectional analog signals are transmitted to and received from a 2-wire transmission channel through line interface circuitry 38. In the illustrated transceiver system of FIG. 2, both the transmitter 30 and receiver 32 are coupled to the transmission channel 36 through the line interface circuitry 38 such that there is a bidirectional signal path between the transceiver and the interface circuit 38. This bidirectional signal path splits into a receive signal path and a transmit signal path at a nexus point 64, at which point both transmit and receive signals are present during full duplex operation. Transmit signals, present on the nexus 64, are isolated from the receive ADC 42 by a transmit signal cancellation circuit 66 which is coupled between the bidirectional signal nexus and the receiver's analog front end.

In a manner to be described in greater detail below, transmit signal cancellation circuitry 66 functions to evaluate signals appearing on the receive signal line and condition those signals such that any transmit signal components are removed from the receive signal line prior to the receive signal's introduction to the analog front end and the receive ADC 36. Further, such conditioning does not perturb any components of the transmit signal prior to the signal's introduction to the channel. Transmit signal cancellation circuitry 66 is connected to receive, and is operatively responsive to, the digital transmission signal directed to the transmit DAC 62 by the pulse shaper 60. Since the cancellation circuit 66 operates in response to the same digital transmission signal as a transmit DAC 62, the cancellation circuit 66 is able to develop a conditioning or cancellation signal which substantially directly corresponds to the analog transmission signal produced by a transceiver's transmit DAC.

In general terms, any analog intelligence signal, whether in baseband or passband, may be processed by the cancellation circuit 66 for full duplex communication over any transmission channel. However, the intelligence signal characteristics are effectively canceled at the inputs of the receive ADC 42 such that full duplex communication can occur without a transmitter's intelligence signal swamping a receive signal that might have been communicated over a generally lossy channel, characterized by a relatively poor noise margin or signal-to-noise ratio (SNR). The transmit intelligence signal is conditioned prior to its being directed to the transmission channel, thus allowing the system to operate on a cleaner signal, resulting in a cleaner, more effective and precise signal suppression characteristic at the receive end of the nexus.

In other words, the present invention contemplates a conditioning or cancellation circuit positioned at a nexus junction of a bi-directional transceiver's transmit block, receive block and transmission channel buffer circuitry, as represented by a line interface circuit. The cancellation circuit operates upon transmit signals appearing on the nexus so as to allow substantially unperturbed passage of analog transmit signals to the channel side of the nexus, while restricting passage of analog transmit signals to the receive side of the nexus such that receive signals can be processed by the analog front end unimpaired by superposed components of transmit signals.

It will be apparent to those having skill in the art that such an arrangement will be particular advantageous in circuitry adapted for use in high speed communication systems, such as gigabit Ethernet. Initial preprocessing of an analog receive signal to remove transmit signal components, allows the resulting signal to be converted into digital form and efficiently demodulated. Several degrees of complexity may be removed from communication devices constructed in accordance with the present invention, particularly those connected with high order impairment cancellation filter designs.

Figure 3:
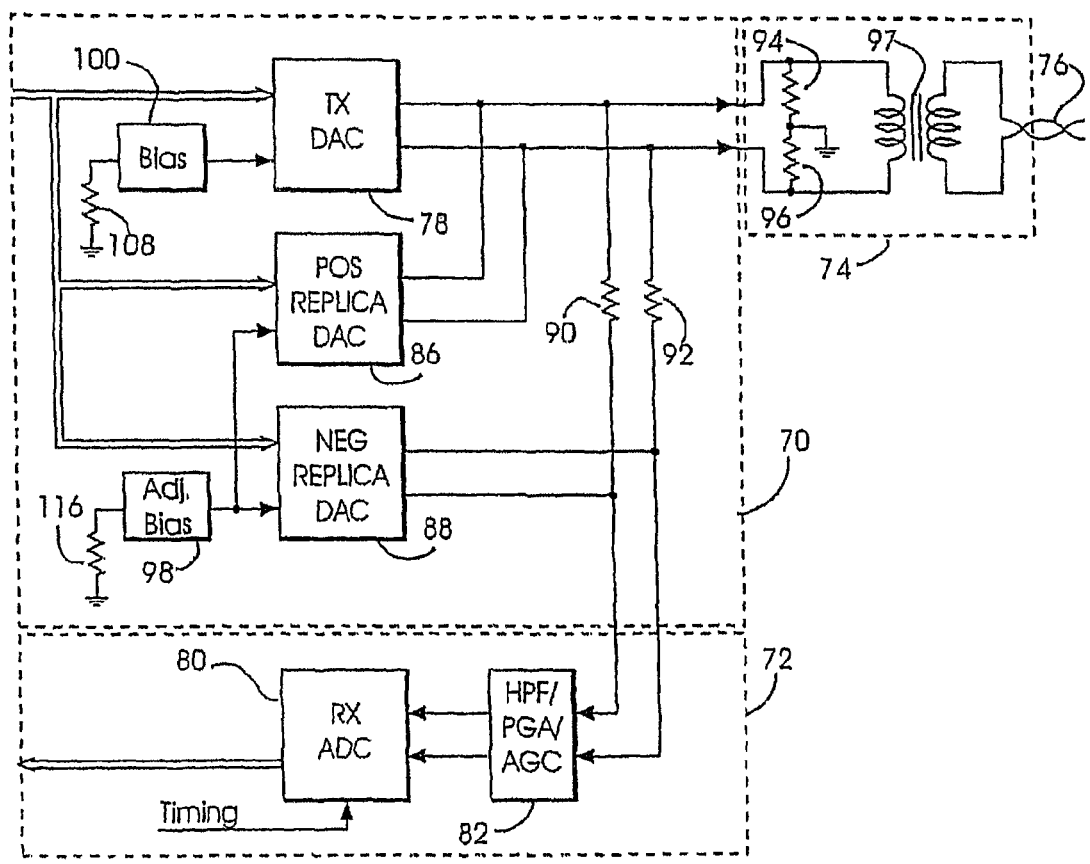
FIG. 3 is a semi-schematic, simplified block diagram of one arrangement of an integrated transceiver including transmission signal cancellation circuitry and a simplified line interface, in accordance with the present invention.

FIG. 3 depicts a semi-schematic, simplified block diagram of one arrangement of an integrated transceiver, including transmission signal cancellation circuitry in accordance with the present invention. The integrated transceiver is so termed because it is implemented as a single integrated circuit chip. However, the transceiver is conceptually and functionally subdivided into a transmitter section 70 and a receiver section 72 connected to communicate analog bidirectional data in full duplex mode over unshielded twisted pair (UTP) wiring, such as might be encountered in a typical local area network (LAN) architecture. In the exemplary embodiment of FIG. 3, the transmitter 70 and receiver 72 are coupled to a UTP transmission channel through a line interface circuit 74 which provides DC offset cancellation, and the like between the transceiver signal I/O and a twisted pair transmission channel 76.

In accordance with practice of principles of the invention, the transceiver's transmit section 70 is implemented to include a main transmit digital-to-analog converter (TX DAC) 78 connected to receive a digital transmit signal and convert that signal into positive and negative analog current mode signals suitable for transmission over the twisted pair transmission channel 76.

In like fashion, the receiver section 72 receives positive and negative analog current mode signals from the transmission channel and converts them into a digital representation in a receive analog-to-digital converter (RX ADC) circuit 80. Following analog-to-digital conversion, receive signals are directed to downstream circuitry in which digital representation of the receive signal is demodulated, filtered and equalized by digital signal processing (DSP) circuitry as described in connection with FIG. 2. Prior to digital conversion, the analog receive signal may be pre-processed by analog front end circuitry 82 which is often adapted to condition and analog receive signal to a form suitable for conversion by the receive ADC 80. Front end circuitry 82 might suitably include a high pass or a band pass filter configured to remove a certain amount of noise and interference from a raw analog receive signal. Band pass filtration is often implemented in architectures where the transmission channel is subdivided into a number of different pass bands each adapted to carry certain types of intelligence. Band pass filtration thus allows only signals occurring in desirable portions of the channel spectrum to be directed to the receive ADC 80 for conversion and further signal processing.

Analog front end circuitry 82 might also include automatic gain control circuitry, input buffer amplifiers, and the like, with various combinations being implemented depending on how the particular channel is configured and also depending on the input requirements of the receive ADC 80, as is well understood by those having skill in the art.

From FIG. 3, it is evident that the signal lines carrying the positive and negative analog receive signals are coupled between the receiver 72 and the line interface circuit 74 in parallel with the signal lines carrying the positive and negative analog transmit signals. Necessarily, analog signals being transmitted to a remote transceiver simultaneously with another remote transceiver's communicating an analog receive signal to the receiver 72, will be asserted both on the transmit signal lines as well as on the parallel-connected receive signal lines.

Accordingly, in the absence of any conditioning or cancellation circuitry, an analog transmit signal will superpose over an analog receive signal at the analog front end 82 and/or the RX ADC 80. Given the substantially greater signal to noise ratio (SNR) of a non-channel impaired transmit signal to a receive signal which is subject to channel impairment, leakage, echos, and the like, it is evident that such an analog transmit signal would substantially perturb a receive signal, making analog-to-digital conversion and downstream signal processing substantially more difficult.

Signal conditioning or cancellation of the analog transmit signal from the analog receive signal path is accomplished by cancellation circuitry which is coupled into the transmit and receive signal paths at a 3-way signal nexis between the transmit DAC 78, the receive ADC 80 and the line interface circuit 74. Cancellation circuitry suitably includes two quasi-parasitic current mode digital-to-analog converters, termed herein a positive replica DAC 86 and a negative replica DAC 88, in combination with first and second cancellation resistors 90 and 92. The positive and negative replica DACs 86 and 88, respectively, are so termed because of the relationship of their signal sense configurations with respect to the positive and negative output signal lines of the TX DAC 78.

In the case of the positive replica DAC 86, its positive signal line is coupled to the positive signal line output from the transmit DAC 78 while its negative signal line is, likewise coupled to the negative signal line of the transmit DAC. In the case of the negative replica DAC 88, its positive signal line is coupled through cancellation resistor 92 to the negative signal line output from the transmit DAC 78. The negative replica DAC's negative signal line is coupled through cancellation resistor 90 to the positive signal line of the transmit DAC. Each of the DACs 78, 86 and 88 are coupled to receive the same digital transmit signal, i.e., the signal intended for conversion by the transmit DAC 78 and transmission over the channel 76 through the line interface circuit 74. Thus, the input to all of the DACs is an identical signal.

In operation, the negative replica DAC 88 may be implemented as a current mode DAC and functions, in combination with cancellation resistors 90 and 92, to define a cancellation voltage, with equal value but opposite phase to the output defined by the transmit DAC 78. Because a negative replica DAC is likewise coupled, in reverse fashion, to the receive ADC 80, the cancellation voltage may also be thought of as applied to the analog front end. Thus, voltage components of a transmit signal are removed from the receive signal lines prior to their introduction to the analog front end.

Because the cancellation voltage is developed by sourcing/sinking current through cancellation resistors 90 and 92, the excess currents sourced/sunk by the negative replica DAC 88 must also be compensated at the output signal lines in order to ensure a proper output voltage at the line interface circuit 74. The positive replica DAC 86 provides the necessary current cancellation function by sinking/sourcing a matched, but opposite phase, current to that developed by the negative replica DAC, thus resulting in zero excess current at the load, indicated in the line interface circuit 74 of FIG. 3 as series-connected resistors 94 and 96, disposed between the positive and negative output signal paths and including a common center tap to a ground potential. It should be mentioned that the configuration of the line interface circuit illustrated in FIG. 3 is an AC equivalent circuit. It will be understood that the circuit is able to be represented in several DC configurations, which will exhibit the same or a substantially similar AC characteristic. Thus the line interface circuit 74 is exemplary.

In operation, cancellation resistors 90 and 92 define cancellation voltages between the outputs of the transmit DAC 78 and the inputs to the receive ADC 80 as a function of a bias current, developed by an adjustable bias circuit 98. The adjustable bias circuit 98 is connected to the positive replica DAC and the negative replica DAC and provides an adjustable bias current to each of the circuit components. The cancellation voltage developed by the cancellation resistors 90 and 92 must cancel the output voltage of the transmit DAC 78 such that the signal at the receive ADC terminals closely track only a signal received from a remote transmitter at the other end of the transmission channel 76. The cancellation voltage across each cancellation resistor is necessarily equal to the value of the cancellation resistor times the current through that resistor (current sourced/sunk by the negative replica DAC). In order to provide effective cancellation, this cancellation voltage must be equal to the output voltage of the transmit DAC which is, in turn, equal to the current produced by the transmit DAC times the load resistance at each terminal (resistor 94 or resistor 96 in parallel with one half the distributed resistance value of the twisted pair wire of the transmission channel).

In accordance with the exemplary embodiment, transmit DAC 78 is implemented as a current mode DAC and defines an output current which is a function of a bias current, in turn defined by a bias circuit 100, the current gain of the bias circuit 100 and the current gain of the transmit DAC 78. Likewise, the cancellation voltage developed by the negative replica DAC 88 is a function of the values of cancellation resistors 90 and 92, the current gain of the adjustable bias circuit 98 and the current gain of the negative replica DAC 88.

Figure 4:
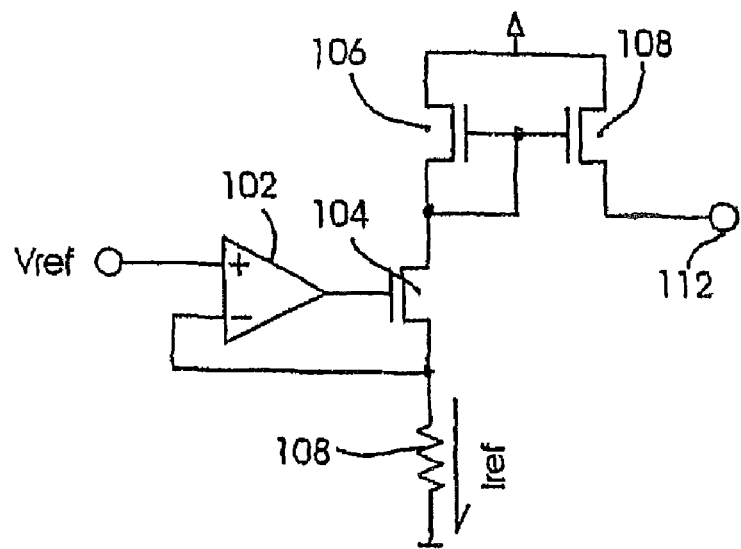
FIG. 4 is a semi-schematic, simplified circuit diagram of one implementation of a precision bias current generator for the transmit DAC of FIG. 3.

FIG. 4 is a simplified circuit schematic diagram of the bias circuit 100 of the transmit DAC 78. In simple terms, the bias circuit 100 might be described as a voltage follower in combination with a bias resistor which develops a stable reference current through one leg of a current mirror. The stable reference current is mirrored to an output current having a particular value defined by the stable reference current and the transistor geometries of the devices defining the current mirror.

In particular, a reference voltage ($V_{REF}$) is applied to the positive terminal of an operational amplifier 102 whose output controls the gate terminal of an N-channel transistor 104. The N-channel transistor 104 is configured as a voltage follower, by having its source terminal fed back to the negative input of the operational amplifier 102. A current source transistor 106 is coupled between the voltage follower device 104 and a power supply potential such as $V_{DD}$ so as to supply a source of current to the voltage follower device 104. As will be understood by those having skill in the art, the voltage follower device, in combination with the operational amplifier 102 function to impress a stable voltage at the device's source node which is equal to the value of the reference voltage $V_{REF}$ applied to the positive terminal of the operational amplifier 102. A bias resistor 108 is coupled between the voltage follower's source node and ground potential, so as to define a particular current value therethrough equal to the reference voltage $V_{REF}$ divided by the value of the bias resistor 108. This current is mirrored to a mirror transistor 109 which is configured with its gate terminal in common to the current source transistor 106. Thus, the mirror transistor 109 conducts a proportional amount of current to the current source transistor 106, with the proportionality governed solely by the ratio of the sizes of the mirror transistor to the current source transistor.

If, for example, with a given reference $V_{REF}$ the value of bias resistor 108 were selected in such a way as to define a current of 1 mA through current source transistor 106, and if mirror transistor 109 were constructed to have a width over length (W/L) ratio of twice that of the source transistor, mirror transistor 109 would define a bias current of 2 mA at the bias circuit output 112. Thus, the bias current developed by bias circuit 100 will be understood to be a stable current which is a function of $V_{REF}$, the bias resistor 108 and the ratio of transistor sizes of the current mirror. The ratio of transistor sizes of the current mirror determines the current gain of the mirror and is easily calculable and adjustable during circuit design.

Figure 5:
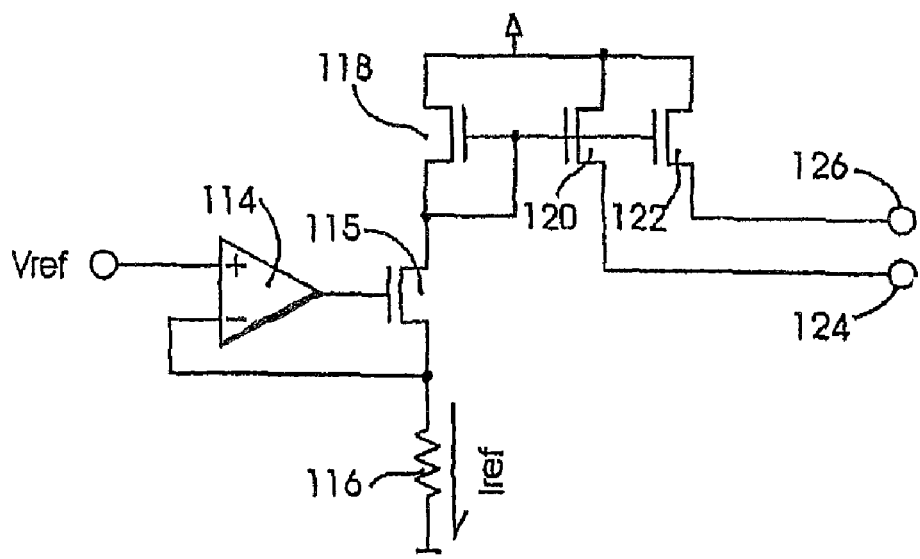
FIG. 5 is a semi-schematic, simplified circuit diagram of one implementation of a variable bias current generator for the replica DACs of FIG. 3.

Turning now to FIG. 5, there is depicted a simplified transistor schematic diagram for the adjustable current bias circuit 98 of FIG. 3. The construction and operation of the adjustable current bias circuit 98 is similar to construction and operation of the bias circuit 100 described in connection with FIG. 3 above. An operational amplifier 114 is operatively responsive to a reference voltage $V_{REF}$ and controls the gate terminal of an N-channel transistor configured as a voltage follower 115 to mirror the reference voltage value at its source terminal. A bias resistor 116 is coupled between the source terminal and ground potential in order to develop a reference current therethrough in a manner similar to the bias resistor 108 of FIG. 4. A current source transistor 118 is coupled between $V_{DD}$ and the source terminal of the voltage follower transistor 115 and mirrors the reference current to parallel-coupled mirror transistors 120 and 122. Mirror transistors 120 and 122 each define a bias current at respective output nodes 124 and 126 of the adjustable bias circuit 98.

In contrast to the bias circuit 100 of FIG. 4 above, the mirror transistors 120 and 122 are each constructed to be ⅕ the size (have ⅕ the W/L ratio) of the current source transistor 118. If the reference current developed across bias resistor 116 was designed to have a value of 1 mA, the current conducted by mirror transistors 120 and 122 would necessarily have a value equal to about 0.2 mA. Thus, the current gain of adjustable bias circuit 98 would be in the range of about 0.2, while the current gain of the bias circuit 100 would be in the range of about 2.0.

In a particular embodiment of the present invention, the bias currents developed by mirror transistors 120 and 122 are able to be adjusted to compensate for variations in transmission line load in order to produce a null transmission signal voltage at the inputs to the receive ADC. Bias current adjustment may be made by adaptively changing the value of bias resistor 116 in order to adaptively modify the value of the reference current developed therethrough. Adjusting the value of the bias resistor 116 can be carried out internally by trimming the resistor at the time the apparatus is packaged as an integrated circuit, or by adaptively writing a control word to a control register that controls the configuration of a resistor ladder. Likewise, it will be understood that adjustment may be made externally by coupling a potentiometer or variable resistor in parallel with bias resistor 116.

Alternatively, bias current adjustment may be made by dynamically changing, or adjusting, the sizes of the mirror transistors 120 and 122 as well as the size of the source transistor. In the present exemplary case, where a 1:5 ratio between currents is desired, the current source transistor might be constructed as an array of fifty (50) transistors, and each of the mirror transistors might be constructed as an array of ten (10) transistors. As changes in the current ratio become desirable, fuse-links coupling the transistors into the array might be "opened" by application of a current, thereby removing a selected transistor or transistors from the array.

Adjusting a bias current by adaptively "trimming" transistors gives a high degree of flexibility and control to the actual value of the current output by the circuit. Transistor trimming of transistors configured in a series-parallel array allows incremental fine tuning of currents, the precision of which is limited only by the number of transistors in the array and the unit widths (W) and lengths (L) used for the elemental transistors.

Returning now to FIG. 3, it should be noted that the current gains of the transmit DAC 78, the positive replica DAC 86 and the negative replica DAC 88 are all designed to be matched and identical. This is accomplished by replicating the integrated circuit design of the transmit DAC to the positive and negative replica DACS. Thus, since the transistor layout and design parameters of all of the DACs are similar it would be expected that the performance characteristics, such as gain, of the DACs would be similar as well. In like fashion, the circuit design and layout of the bias circuit 100 is replicated in the adjustable bias circuit 98, with the exception of the transistor sizings of the mirror transistors. Thus, the current gain of the adjustable current bias circuit 98 is expected to proportionally track the current gain of current bias circuit 100 over the corners of integrated circuit manufacturing process variations. That is, if the gain of bias circuit 100 is skewed in one direction by a certain percentage, the gain of the adjustable bias circuit 98 will be expected to also vary in the same direction by approximately the same percentage. Accordingly, the ratio of the bias current developed by bias circuit 100 to the bias currents developed by adjustable bias circuit 98 will remain substantially constant.

In accordance with the principles of the invention, the current gain of the adjustable bias circuit 98 is chosen to be substantially smaller than the current gain of bias circuit 100, in order to minimize the current and power requirements of the positive and negative replica DAC's line driver circuitry. Accordingly, the values for the cancellation resistors 90 and 92 are selected so as to develop a cancellation voltage equal to the transmit DAC output voltage, based on the designed current gains. In other words, based on Ohm's law, the smaller the output current, the larger the required cancellation resistors in order to produce a fixed cancellation voltage equal to the transmit DAC output voltage.

Because the positive replica DAC 86 is closely matched in performance characteristics with a negative replica DAC 88, the current that the negative replica DAC sources/sinks is canceled by a matched current sunk/sourced by the positive replica DAC. This current cancellation results in zero excess current at the transmit DAC output, leaving only the desired transmit signal at the line interface load.

In order to ensure stability of the voltage cancellation function over manufacturing process parameter, power supply voltage and thermal variations, the adjustable bias circuit resistor 116 and the cancellation resistors 90 and 92 are constructed from the same semiconductor material (polysilicon, for example) and are laid out in proximity to one another so as to track each other over process parametric, power supply and/or thermal variations. In this manner, induced cancellation voltages across cancellation resistors 90 and 92, will be understood to be independent of process variations. Because the positive replica DAC 86 is driven by the same adjustable bias circuit 98 as the negative replica DAC 88, the cancellation currents developed by the positive replica DAC will be expected to closely track the currents developed through negative replica DAC 88.

One particular utility of the present invention may be found in its ability to produce a cancellation signal which is substantially a mirror image of a simultaneously asserted transmit signal and provide the cancellation signal at the input of a transceiver's receive ADC or analog front end. The effectiveness of the present invention will be more clearly understood with reference to the timing diagram of FIG. 6 which illustrates the signal state at various nodes in the exemplary transceiver circuit of FIG. 3. For example, the periodic signal depicted at FIG. 6(*a*) might represent the source voltage developed by a remote transceiver at the other end of the transmission line which is to be received by the local transceiver. The signal depicted at FIG. 6(*c*) might represent an analog transmit signal developed by the local transmitter and which is simultaneously asserted to the line interface circuit and the transmission channel as the intended receive signal depicted at FIG. 6(*a*). The signal illustrated in FIG. 6(*b*) represents the signal that might be seen on the channel (76 of FIG. 3) and might be described as a linear combination of the transmit signal (c) and the receive signal (a) along with such impairments as are common in UTP transmission channels.

Figure 6:
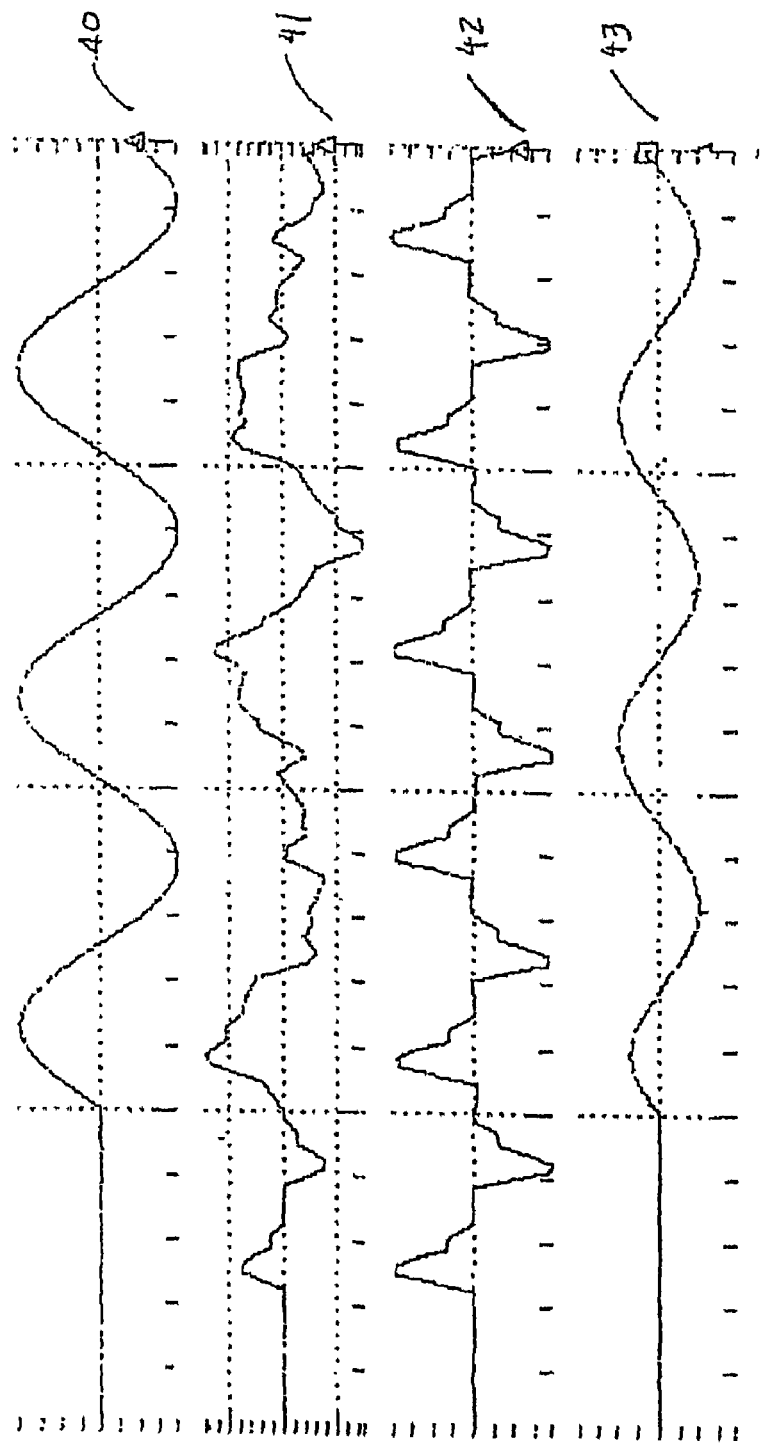
FIG. 6 is a simplified timing diagram illustrating transmission signal perturbation of a receive signal and the effects of transmission signal cancellation in accordance with the present invention.

The signal depicted at FIG. 6(*d*) represents the signal appearing at the input to the analog front end or the receive ADC, after the transmit cancellation signal has been subtracted from the combination signal at (b). As can be seen from the waveform diagrams of FIG. 6, the receive signal (d) has a substantially greater fidelity to the original signal (a) than the combination signal (b) appearing on the channel.

Notwithstanding its ability to effectively and accurately cancel local transmit signals from, a local receiver's input signal path, the invention is additionally advantageous in that it obviates the need for complex and costly external magnetic hybrid circuits to interface between a transceiver in a twisted pair transmission channel. In particular, as can be seen in FIG. 3, the line interface circuit 74, between the transceiver and the channel, can be simply implemented by a pair of series coupled resistors and a relatively simple transformer element (indicated at 97 in FIG. 3) which, in the present case, is needed only to provide common-mode voltage rejection and DC isolation between the channel and the transceiver I/O.

Further, transmit signal cancellation circuitry and the line interface circuit are particularly suitable for implementation in a single chip integrated circuit. The replica DACs and resistors are all constructed of common integrated circuit elements and can be implemented on a single chip along with the remaining components of a high speed bidirectional communication transceiver. In accordance with the invention, only the transformer portion of a line interface circuit is contemplated as an off-chip circuit element. Even though the exemplary embodiment contemplates the transformer being provided off-chip, it will be understood by those familiar with integrated circuit design and fabrication that suitable transformers can be constructed from integrated circuit elements, such as combinations of spiral inductors, and the like, and still provide sufficient DC coupling between a transmission channel and an integrated circuit transceiver.

While the invention has been described in terms of integrated circuit technology implementing a gigabit-type multi-pair ethernet transceiver, it will be evident to one having skill in the art that the invention may be suitably implemented in other semiconductor technologies, such as bipolar, bi-CMOS, and the like as well as be portable to other forms of bidirectional communication devices that operate in full duplex mode. Moreover, the circuitry according to the invention may be constructed from discrete components as opposed to a monolithic circuit, so long as the individual components are matched as closely as possible to one another.

It will thus be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A bidirectional communication system, configured for full duplex communication, comprising:
   a communication channel;
   a main transmitter having an output for asserting a transmit signal;
   a transmit signal path electrically coupled between the communication channel and the output of the main transmitter;
   a receiver having an input for receiving a receive signal; a receive signal path electrically coupled between the communication channel and the input of the receiver, the receive signal path further coupled, in parallel fashion, to the transmit signal path; and
   a transmit signal cancellation circuit electrically coupled to the receive signal path, the transmit signal cancellation circuit developing a cancellation signal, representing a transmit signal, and asserting the cancellation signal on the receive signal path so as to prevent the transmit signal from being asserted to the input of the receiver, wherein the cancellation signal comprises a first component and a second component, the first component representing a mirror image of the transmit signal and the second component representing a direct image of the transmit signal.

2. The communication system according to claim 1, the transmit signal cancellation circuit further comprising:
   a first replica transmitter having an output electrically coupled to the receive signal path between the main transmitter and the receiver; and
   a cancellation impedance circuit electrically coupled into the receive signal path between the output of the first replica transmitter and the output of the main transmitter, and between the output of the main transmitter and the input of the receiver.

3. The communication system according to claim 2, further comprising a second replica transmitter having an output electrically coupled to the transmit signal path between the main transmitter and the cancellation impedance circuit.

4. The communication system according to claim 3, the first replica transmitter outputting the first component to the receive signal path so as to cancel a first signal characteristic of the transmit signal.

5. The communication system according to claim 4, the second replica transmitter outputting the second component to the receive signal path so as to cancel a second signal characteristic of the transmit signal.

6. The communication system according to claim 5, wherein the transmit signal is characterized by a voltage component and a current component, the first replica transmitter outputting the first cancellation signal component to the receive signal path so as to cancel the voltage component of the transmit signal, the second replica transmitter outputting the second cancellation signal component to the receive signal path so as to cancel the current component of the transmit signal.

7. The communication system according to claim 6, wherein the main transmitter, the first replica transmitter and the second replica transmitter each comprise a digital-to-analog converter.

8. The communication system according to claim 7, further comprising:
   a line interface circuit coupled between the channel at one port and the transmit signal path and the receive signal path at another port, the line interface circuit including a load impedance; and
   wherein the digital-to-analog converters are current mode devices, the load impedance defining a voltage mode transmit signal from a current mode transmit signal output by the main transmitter.

9. The communication system according to claim 8, the first replica transmitter defining a current mode cancellation signal, the cancellation impedance circuit defining a voltage mode cancellation signal from the current mode cancellation signal.

10. A method for separating a transmit signal from a simultaneously asserted receive signal in a bidirectional, full duplex transmission system having a transmitter and a receiver sharing a common signal path, comprising the steps of:
    generating a transmit signal on the common signal path;
    generating a first cancellation signal corresponding to the transmit signal, the first cancellation signal representing a mirror image of a voltage component of the transmit signal;
    generating a second cancellation signal corresponding to the transmit signal, the second cancellation signal representing a direct image of a current component of the transmit signal; and
    electrically combining the first and second cancellation signals with the transmit signal on the common signal path so as to substantially remove the transmit signal from the common signal path.

11. The method according to claim 10, further comprising:
    providing a communication channel; providing an interface circuit coupled between the communication channel and the common signal path, the interface circuit including a load impedance element; and
    wherein the transmit signal is a differential current mode signal, the load impedance element defining a differential voltage mode signal therefrom.

12. The method according to claim 11, the first cancellation signal generating step comprising:
    generating a first differential current mode cancellation signal; and
    converting the first differential current mode cancellation signal to a first differential voltage mode cancellation signal by passing the first differential current mode cancellation signal through a cancellation impedance element.

13. The method according to claim 12, the second cancellation signal generating step comprising:

generating a second differential current mode cancellation signal; and wherein the positive and negative portions of the second differential current mode cancellation signal are combined with respective positive and negative portions of the transmit signal and with respective negative and positive portions of the first differential current mode signal.

14. The method according to claim 13, the electrically combining step further comprising:

adding the first differential voltage mode cancellation signal to the differential transmit signal to thereby cancel the differential voltage mode signal developed by the interface circuit; and adding the second differential current mode cancellation signal to the differential transmit signal to thereby cancel excess differential current mode signals introduced by the previous step.

15. An adaptive transmission signal cancellation circuit for separating transmit data from receive data in a bidirectional communication system comprising:

a transmit DAC having positive and negative output terminals for asserting differential analog transmit signals;

a receive ADC having positive and negative input terminals for receiving differential analog receive signals, the receiver's input terminals electronically coupled to the transmitter's respective like output terminals over a common signal path;

a first replica DAC having positive and negative output terminals for asserting a first differential analog cancellation signal, the positive terminal of the first replica DAC coupled to the negative terminal of the transmit DAC, the negative terminal of the first replica DAC coupled to the positive terminal of the transmit DAC over the common signal path;

a second replica DAC having positive and negative output terminals for asserting a second differential analog cancellation signal, the positive terminal and the negative terminal of the second replica DAC coupled to the transmit DAC via cancellation resistors over the common signal path; and a cancellation impedance circuit coupled into the common signal path between the transmit DAC and the first replica DAC and between the transmit DAC and the receive ADC.

16. The transmission signal cancellation circuit according to claim 15, wherein the transmit DAC and the first and second replica DACs are each connected to receive and are operatively responsive to a digital signal representing the differential analog transmit signal.

17. The transmission signal cancellation circuit according to claim 16, wherein the transmit DAC asserts the differential analog transmit signal as a current mode signal, the current mode signal being converted to a voltage mode signal by an impedance load.

18. The transmission signal cancellation circuit according to claim 17, wherein the first replica DAC asserts the first analog cancellation signal as a current mode signal, the current mode signal being converted to a voltage mode signal by the cancellation impedance circuit.

19. The transmission signal cancellation circuit according to claim 18, wherein the second replica DAC asserts the second analog cancellation signal as a current mode signal, the current mode signal being directly applied to the common signal path.

20. The transmission signal cancellation circuit according to claim 19, wherein the first and second analog cancellation signals are electrically added to the differential analog transmit signal on the common signal path, so as to cancel differential voltage and differential current components of the transmit signal therefrom, thereby facilitating full duplex operation without superposition of a transmit signal over a simultaneous receive signal on the common signal path.

21. The transmission signal cancellation circuit according to claim 20, wherein the common signal path is coupled to a transmission channel through a line interface circuit, the line interface circuit including only said impedance load and a coupling transformer.

22. The transmission signal cancellation circuit according to claim 21, wherein the transmission channel is an unshielded twisted pair cable.

23. The transmission signal cancellation circuit according to claim 22, wherein the transmission channel is a gigabit Ethernet channel.

24. A system for separating a transmit signal from a simultaneously asserted receive signal, comprising:

means for generating a transmit signal on a common signal path;

means for generating a first cancellation signal corresponding to the transmit signal, the first cancellation signal representing a mirror image of a voltage component of the transmit signal;

means for generating a second cancellation signal corresponding to the transmit signal, the second cancellation signal representing a direct image of a current component of the transmit signal; and means for electrically combining the first and second cancellation signals with the transmit signal on the common signal path so as to substantially remove the transmit signal from the common signal path.

25. The system of claim 24, further comprising:
means for providing a communication channel;
means for providing an interface circuit coupled between the communication channel and the common signal path, the interface circuit including a load impedance element, wherein the transmit signal is a differential current mode signal, the load impedance element defining a differential voltage mode signal therefrom.

* * * * *